US 6,751,624 B2

(54) METHOD AND SYSTEM FOR CONDUCTING A FULL TEXT SEARCH ON A CLIENT SYSTEM BY A SERVER SYSTEM (75) Inventors: David B. Christal, San Antonio, TX (US); Nimesh Khatri, San Antonio, TX (US)

(73) Assignee: Globalscape, Inc., San Antonio, TX (US)

( * ) Notice: Subject to any disclaimer, the term of this patent is extended or adjusted under 35 U.S.C. 154(b) by 190 days.

(21) Appl. No.: 09/826,068

(22) Filed: Apr. 4, 2001

(65) Prior Publication Data

US 2001/0056414 A1 Dec. 27, 2001

Related U.S. Application Data

(60) Provisional application No. 60/194,428, filed on Apr. 4, 2000.

(51) Int. Cl.$^7$ ................................. G06F 17/30
(52) U.S. Cl. .................. 707/101; 707/100; 707/6; 707/7
(58) Field of Search ................. 341/107; 704/230; 707/101, 6, 7, 100, 102; 382/209

(56) References Cited

U.S. PATENT DOCUMENTS

| | | | |
|---|---|---|---|
| 5,717,393 A | | 2/1998 | Nakano et al. ............... 341/50 |
| 6,075,470 A | * | 6/2000 | Little et al. ................. 341/107 |
| 6,119,120 A | * | 9/2000 | Miller ......................... 707/101 |
| 6,138,129 A | * | 10/2000 | Combs ........................ 707/6 |
| 6,199,064 B1 | * | 3/2001 | Schindler .................... 707/7 |
| 6,363,174 B1 | * | 3/2002 | Lu ............................. 382/209 |
| 6,493,666 B2 | * | 12/2002 | Wiese, Jr. .................. 704/230 |
| 6,526,401 B1 | | 2/2003 | Ito .............................. 707/3 |

OTHER PUBLICATIONS

N. Jesper Larsson, "The Context Trees of Block Sorting Compression," Proceedings of the IEEE Data Compression Conference, Mar. 1998, pp. 189–198.

Kunihiko Sadakane, "A Fast Algorithm For Making Suffix Arrays And For Burrows–Wheeler Transformation," Proceedings of IEEE Data Compression Conference, Mar. 1998, pp. 129–138.

Kunihiko Sadakane and Hiroshi Imai, "A Cooperative Distributed Text Database Management Method Unifying Search And Compression Based On The Burrows–Wheeler Transformation," Advances in Database Technologies, No. 1552 in LNCS, 1999, pp. 434–445.

Ferragina, et al., "An Experimental Study of A Compressed Index", Proc. 12$^{th}$ ACM–SIAM Symposium on Discrete Algorithms (SODA), 2001 [Abstract Only].

(List continued on next page.)

Primary Examiner—Jean M. Corrielus
(74) Attorney, Agent, or Firm—Campbell Stephenson Ascolese LLP (57) ABSTRACT

A full text search involving an index of a string of characters on a client for use on a server. The client searches for data and file information to share and creates a character string containing the information. This string is transformed using the Burrows-Wheeler method. A rotation matrix is created and the last column compressed before transmission. The server decompresses the data, reverses the transformation and creates a suffix array. The string and suffix array are stored. A second client search can be conducted of the suffix array. The server sends the second client a list of located information. A message may then be directed between the second and first clients without server involvement. Each client on the server will have the string and suffix array stored in the server until it signs off. The server has a dynamic index of data available for transfer between clients.

20 Claims, 8 Drawing Sheets

OTHER PUBLICATIONS

Ferragina, et al., "Opportunistic Data Structures With Applications", *Proc. 14th IEEE Symposium on Foundation of Computer Science (FOCS)*, 2000 [Abstract Only].

Ferragina, et al., "Full–Text Index in Minute Space", *FM Index*, 2000.

Nelson, "Data Compression With The Burrows–Wheeler Transform", *Dr. Dobb's Journal*, Sep. 1996 [Best Available Copy].

Burrows, et al., "A Block–Sorting Lossless Data Compression Algorithm", *Digital SRC Report*, Technical Report 124, May 10, 1994.

Sadakane, "A Modified Burrows–Wheeler Transformation For Case–Insensitive Search With Application To Suffix Array Compression", *Department of Information Science, University of Tokyo*. [Abstract & References, Date Unknown].

* cited by examiner

METHOD AND SYSTEM FOR CONDUCTING A FULL TEXT SEARCH ON A CLIENT SYSTEM BY A SERVER SYSTEM

RELATION PRIOR FILED APPLICATIONS

This application claims the benefit of the filing of U.S. Provisional Patent Application Ser. No.: 60/194,428 filed Apr. 4, 2000.

BACKGROUND OF THE INVENTION

1. Field of the Invention

The present invention relates generally to systems and methods for conducting computer based text searching. The present invention relates more specifically to systems and methods for carrying out a text search from a server computer system on data and file information located on a client computer system.

2. Background Information

The Internet comprises a vast number of computers and computer networks that are interconnected through communication links. The interconnected computers exchange information using various services such as electronic mail, Gopher, FTP, and the World Wide Web. All of these technologies require a level of knowledge that is greater than that possessed by the average Internet user who might want to share information. Additionally, the Internet is in a constant state of fluctuation. FTP servers and web sites come and go. A person searching for a particular file using a web browser and any of the popular search engines (Lycos®, Yahoo®, Alta Vista®, etc.) can expect to have mixed to poor results because of such factors as stale links, ratio or account requirements on FTP sites, as well as unknown bandwidth availability on a given site.

Typically when a user wishes to share some of his files, he designs a web site and/or acquires and sets up an FTP server. Either of these tasks requires more expertise than the average Internet user possesses, therefore, much of what could be shared on the Internet is not.

When a user decides to look for a file on the Internet, he will typically use his web browser to contact a search engine. Since major search engines face the daunting task of trying to index every single web page and/or FTP site, the information they return will necessarily be aged and incomplete. Often a search of FTP servers will yield the location of a file and whether the FTP server will be online. The owner of the FTP site, however, will typically have further requirements, such as a user account, or he may require users to upload files before he will allow the user to download anything.

What is needed is an efficient method of creating a dynamic and constantly updated index of that information available on the Internet so that when a person conducts a search and locates information, the person knows that the information is immediately available.

SUMMARY OF THE INVENTION

In view of the above, the present invention is advantageous in that it provides a dynamic and constantly updated searchable index of information that is available on the Internet. To accomplish this, the disclosed invention provides a suffix array search system that allows the rapid searching of large amounts of information from large numbers of users while minimizing the required amount of bandwidth and minimizing the amount of utilized server system resources. The result is that the present invention enables a person searching the Internet to quickly locate and transfer available information.

The present invention may be summarized as a system and method for conducting a full text search on a client system by creating a full text search index of a string of characters on a client system for use on a server system. When a client system signs on to a server system, the client's system searches for relevant data and file information about that data which the user is willing to share and creates an original string of characters that contains file information such as file name, location, and size. The original string of characters is transformed using the Burrows-Wheeler transformation method. In the transformation, a rotation matrix is created of the original string of characters and the last column of the matrix is compressed using a standard compression method before being transmitted to the server system. The server system decompresses the data using the same standard decompression method. The transformation of the file information is reversed to recover the original string of characters. While recovering the original string of characters, a suffix array is created. The original string of characters and suffix array are stored in the memory of the server system. A binary search can be conducted of the suffix array to efficiently locate any sub-string of characters within the original string of characters.

A second client system signing on to the server system can initiate a search of the memory of the server system for a selected sub-string of characters. Once the selected sub-string of characters is found, the server system sends the second client system a list of the located relevant information (filename, location, size, user IP, user port, etc.). If the second user wants to obtain a copy of the data, a message is sent directly between the second client system and the first client system without the server system being involved unless the first client system is behind a firewall. When the first client system is behind a firewall, the request for the file is relayed through the server system. The requested data will then be transferred from the first client system to the second client system.

Each client system willing to share data that is signed on to the server system will have the original string of characters and the suffix array created for the client system and stored in the server system memory only while the client system is signed on to the server system. As soon as the client system signs off the server system, that client system's original string of characters and suffix array are deleted from the server system. This creation of a client system's original string of characters and suffix array only while the client system is signed on the server system enables the server system to have a dynamic and constantly updated index of data, which is available for transfer between client systems.

Other objects and advantages of the present invention will become apparent from the following description of the preferred embodiment with reference to the drawings.

DETAILED DESCRIPTION OF THE PREFERRED EMBODIMENT

The present invention is a method and system for conducting a full text search on a client system by creating a full text search index of a string of characters on a client system for use on a server system. The general operation of the system as a whole is described in FIG. 1. A client software program (hereinafter "Client 1") is used to identify which files a user wishes to share with other users. Client 1 will usually access the Internet and log into a registration server which assigns Client 1 to a search server (Step 10). The search server may be one of many search servers available to the registration server. Client 1 creates an original string of characters, commonly referred to as a text file, consisting of the name, location, size, and other file information of each file the user wishes to share (Step 12). For searching purposes, each upper case character in the text file is converted to a lower case character. The original string of characters is rearranged by Client 1 using the Burrows-Wheeler transformation method (Step 14). In the transformation, a rotation matrix is created of the original string of characters and the last column of the matrix is compressed (Step 16) using conventional compressing techniques (e.g., run length encoding, move to front encoding, order-0 adaptive arithmetic encoding, etc). Client 1 then transmits the compressed file information to the search server (Step 18). If character case retention is desired, the original string of characters, after being converted to lower case, may be appended with a string of bytes, each bit of which represents the original case of each character of the original text. This bit information is then available to the search server to restore the proper case of characters when returning search results. With such case retention, the rotation matrix is created out of a lower case rendition of the original text with the case bits appended to the end of the string.

The Burrows-Wheeler Transform method is a data compression algorithm developed by M. Burrows and D. J. Wheeler which transforms a block of data into a format that is well suited for compression. A detailed description of this method may be found in M. Burrows and D. J. Wheeler, "A Block-sorting Lossless Data Compression Algorithm", SRC Research Report, May 10, 1994; and Nelson, Mark, "Data Compression with the Burrows-Wheeler Transform", *Dr. Dobb's Journal,* September 1996. Each of these articles are hereby incorporated by reference in their entirety as if they were completely re-written herein.

Figure 1:
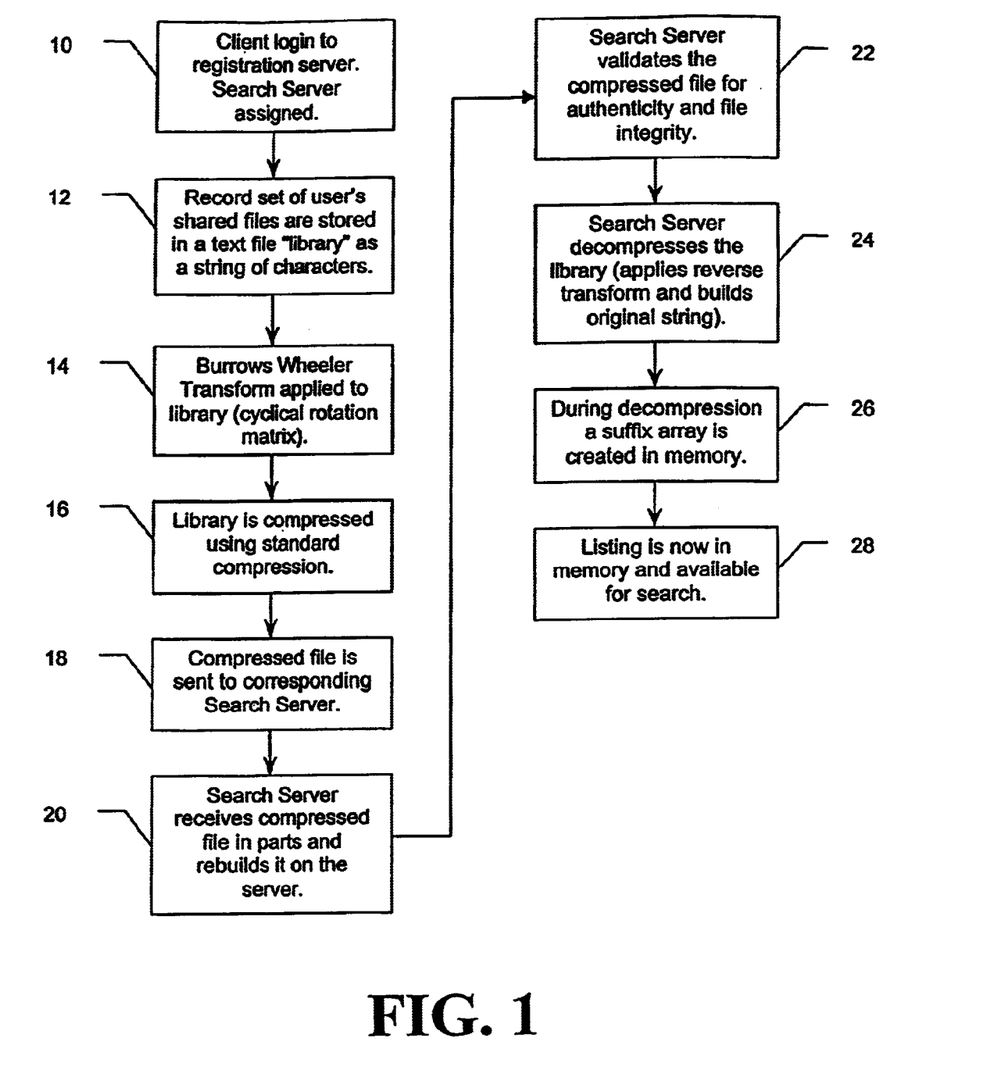
FIG. 1 is a flow chart illustrating an embodiment of the method of the present invention.

The search server receives the compressed file (Step 20), validates it (Step 22), and decompresses it (Step 24) using the reciprocal conventional decompression techniques. During the process of restoring each character in the Burrows-Wheeler Transform to its original position in the original string of characters, the character's position is noted and the first character of the rotation it represents is represented in a suffix array (Step 26). The novel and non-obvious creation of the suffix array is used for searching purposes (Step 28) which is described in more detail below.

Figure 2:
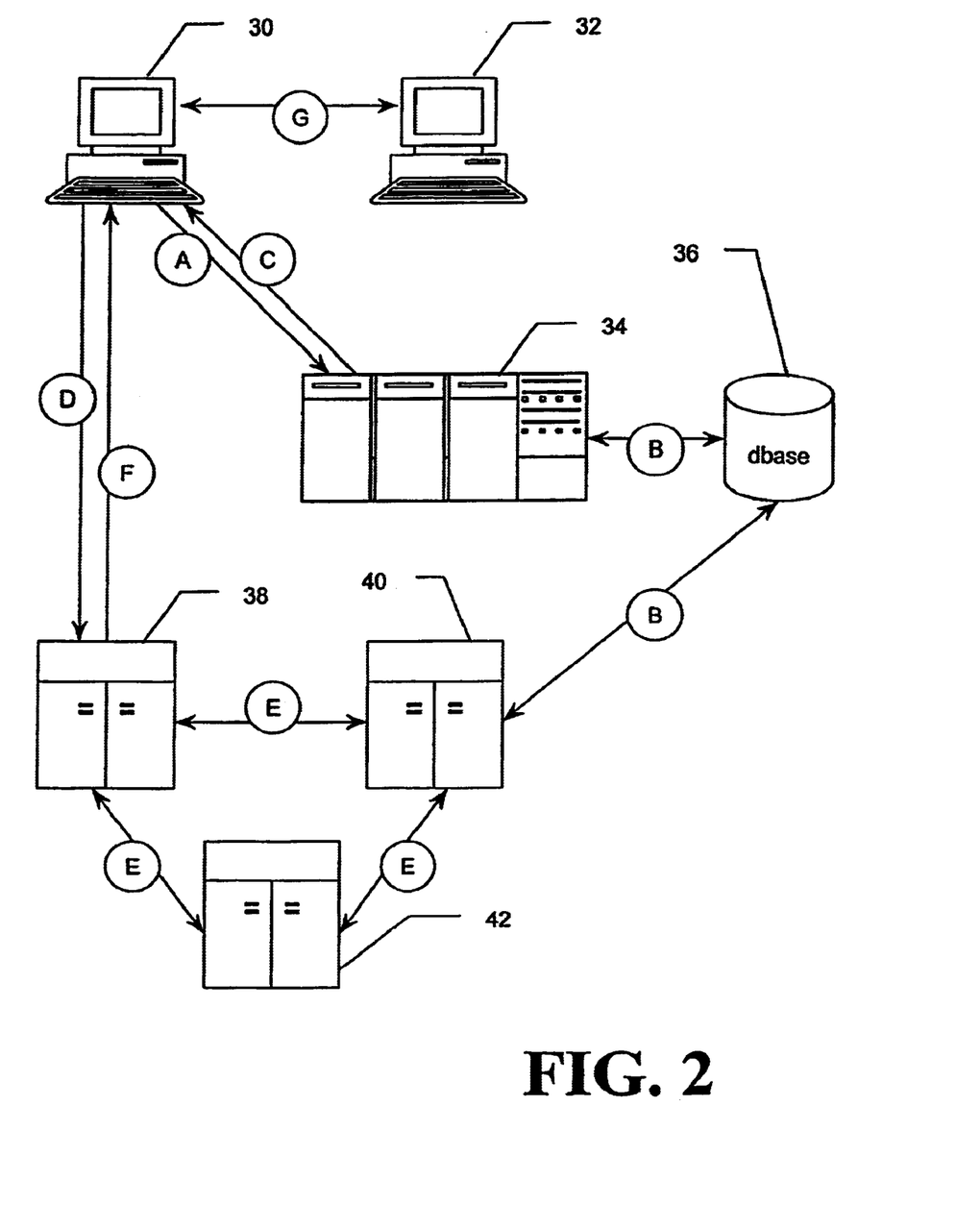
FIG. 2 is a high level architectural drawing illustrating the primary components of a system that operates in accordance with the present invention.

Reference is now made to FIG. 2 for a brief description of a system architecture appropriate for implementing the methods of the present invention. The elements of the system shown in FIG. 2 are typical of client and server systems that make up a part of the Internet. Client systems 30 and 32 represent two of many such typical client servers. Client system 30 represents a system that originally implements the method of the present invention to identify files that are willing to be shared. The initial process (A) comprises logging in with a registration server 34. In this manner a record set of client system 30 shared files is stored in process (B) in a text file library database 36. The compressed file is further sent in process (B) to a corresponding search server 40.

An inquiry search initiated by client system 30 in process (D) would initiate the methods described above to identify the text string through a first assigned search server 38 and then through other search servers 40 and 42 in process (E) if necessary. A search result is returned to client system 30 in process (F) which may provide for a direct communication in process (G) between client system 30 and a second client system 32 where the searched for data may be located.

Figure 3:
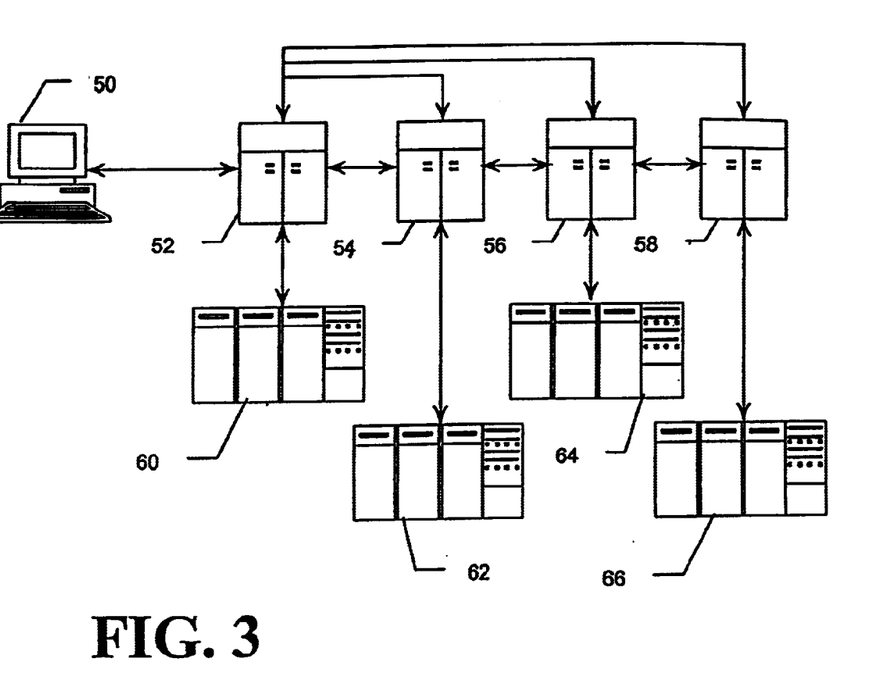
FIG. 3 is a high level architectural drawing illustrating the primary components of the present invention illustrating a search for data in multiple search servers.

FIG. 3 represents the system architecture evident when multiple search servers are required in a data search. Here client system 50 communicates directly with an assigned search server system 52 which in turn acts as a client to communicate with a number of additional search servers 54, 56 and 58. Each of the search server systems 52, 54, 56 and 58 are in communication with client library databases 60, 62, 64 and 66 respectively. The client libraries found on databases 60, 62, 64 and 66 contain the record sets of user shared file identifiers for registered clients associated with those search server systems, 52, 54, 56 and 58.

Figure 4:
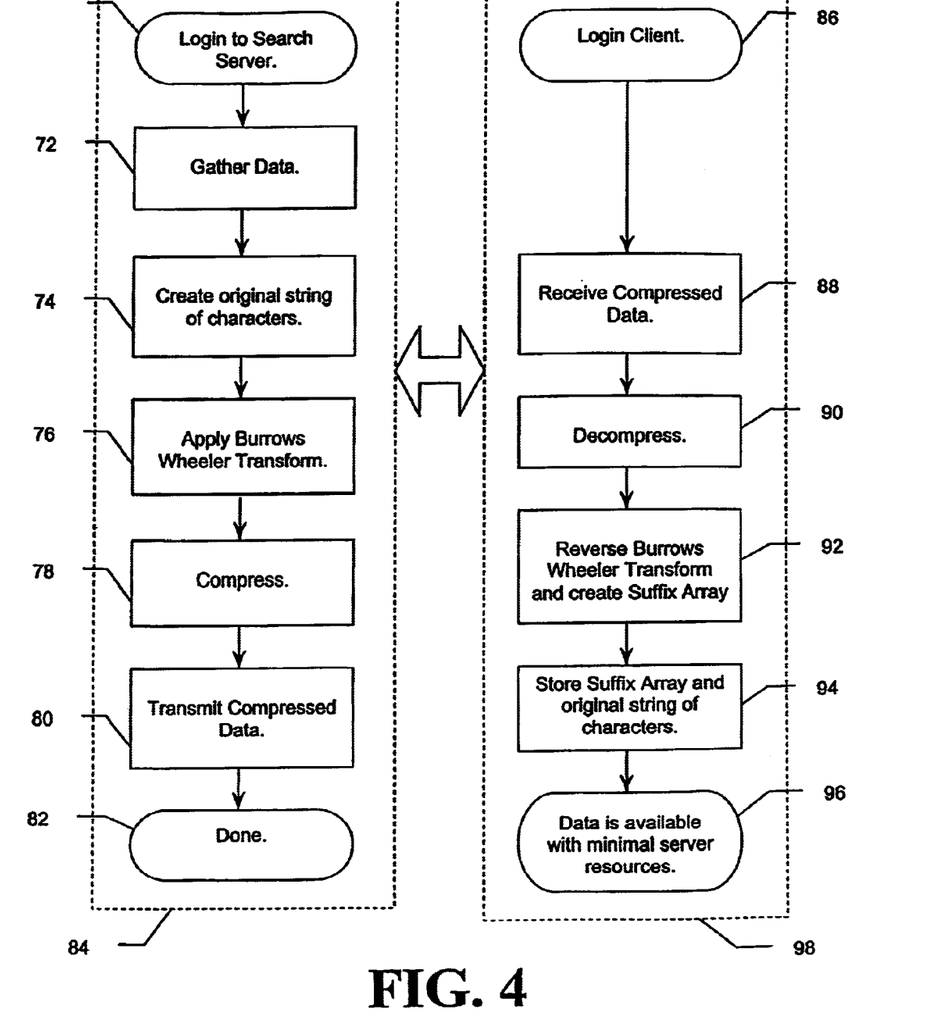
FIG. 4 is a flow chart illustrating steps in the method of the present invention carried out on a client system and a server system.

FIG. 4 provides an alternate description of the initial client "registration" process described above with respect to FIG. 1. The arrangement of process steps shown in FIG. 2 is separated between the client system (step group 84 on the left in the figure) and the assigned server system (step group 98 on the right in the figure). The initial action of the client to login to a search server (Step 70) is responded to by the search server by receiving the client login (Step 86). The following steps of gathering the data on the client system (Step 72), creating the original string of characters (Step 74), applying the Burroughs Wheeler Transform (Step 76), compressing the data (Step 78) and transmitting the data (Step 80) are all carried out on the client system. It is understood that the software code necessary to implement these steps as described in more detail above and below, has been provided to the client system, typically through an appropriate download of the software from a central server location. The transmission of the compressed data (Step 80) completes the processing (Step 82) at the client system. The search server picks up the process by receiving the compressed data (Step 88), decompressing the data (Step 90), applying the reverse Burroughs Wheeler Transform (Step 92) and creating the Suffix Array (also Step 92). The search server then stores the Suffix Array and the original string of characters (Step 94) which now makes them available for searching (Step 96) while having utilized only minimal server resources.

Each client system willing to share data which is signed on to the server system will have the original string of characters and the suffix array created by the server system for the client system and stored in the server system memory while the client system is signed on to the server system. As soon as the client system signs off the server system, that client system's original string of characters and suffix array are deleted from the server system. This creation of a client system's original string of characters and suffix array only while the client system is signed on the server system enables the server system to have a dynamic and constantly updated index of data, which is available for transfer between client systems.

A second client software program (Client 2) signing on to the server system can initiate a search of the memory of the server system for a selected sub-string of characters. Client 2's search request is converted to lower case. A binary search is performed on each of the suffix arrays in the search server memory to rapidly determine if the requested data exists in any of the libraries stored on the search server. If the requested substring of characters is identified, then that client's (Client 1) Internet address, user IP, user port, file location, filename (with case restored), file size, etc. are sent to Client 2 by the search server. If the second user wants to obtain a copy of the data, a message is sent directly between Client 2 and Client 1 without the server system being involved unless the Client 1 is behind a firewall. In this case the request for the file is relayed through the server system. The requested data will then be directly transferred from Client 1 to Client 2.

If the requested sub-string of characters is not found in Client 1's library, the other libraries contained on the search server are searched. If Client 2's requested sub-string of characters still hasn't been filled, the search server then acts as a client, requesting the file from as many of the other search servers associated with the registration server as are readily available. Once the sub-string of characters is found on a client's shared library, the search server then relays that client's Internet address, user IP, user port, file location, filename (with case restored), file size, etc. to Client 2.

The suffix array search method and system of the present invention allows the rapid and efficient searching of large amounts of information from large numbers of users while minimizing the required amount of bandwidth and conservatively using server resources. The preferred embodiment involves creating a set of information on a client computer system using the client computer system's computing resources, and then transporting the information to a central server where the information can be efficiently searched. In order to search a large block of text efficiently an index is created. The suffix array of the present invention is an array of all the suffixes of a string in lexicographical created order to be able to perform a binary search. A binary search is an algorithm to search such an array. The search begins with an interval covering the whole array. If the search value is less than the item in the middle of the interval, the search narrows the interval to the lower half. Otherwise the search narrows the interval to the upper half. The search repeatedly checks for the sub-string of information until the sub-string of characters is found or the interval is empty. This suffix array is a compact and desirable structure for such searching purposes.

EXAMPLE 1

The following is an example of a suffix array using the word "Bananas" as the original string of characters. Since the word "Bananas" has 7 characters it therefore has 7 possible suffixes. The '~' is a special character marking the end of the string.

Index for each character in "bananas":

TABLE 1

| Character | b | a | n | a | n | a | s | ~ |
|---|---|---|---|---|---|---|---|---|
| Index | 0 | 1 | 2 | 3 | 4 | 5 | 6 | 7 |

A list of the possible suffixes in lexicographic order with the specific suffix number is shown:

TABLE 2

| Suffix | Index |
|---|---|
| ananas | 1 |
| anas | 3 |
| as | 5 |
| bananas | 0 |
| nanas | 2 |
| nas | 4 |
| s | 6 |
| ~ | 7 |

The actual suffix array is the series of numbers (1,3,5,0,2,4,6,7) which represents the character index of each possible suffix of the original string of characters: "bananas~". Bananas is indexed as "0" since it is the original string of characters. By taking away the letter "b", the first possible suffix is created as "ananas" and is indexed as "1". By taking away the letters "ba", the second possible suffix is created as "nanas" and is indexed as "2". By taking away the letters "ban", the third possible suffix is created as "anas" and is indexed as "3". This is repeated for the entire length of the original string of characters. The example could be expanded to include a string of characters of any length, for example, a user's list of all files that he is sharing. It is important to note that each of the suffixes does not have to be rewritten, all that is now required to store is the original string of characters, and the list of pointers. A very efficient binary search through a large string of characters to determine if there is a match is now available.

EXAMPLE 2

The following provides an example of the sort rotations step of the Burrows-Wheeler Transform using the original string of characters of the first example, i.e., "Bananas".

A block of "N" (N=8 in this example) characters "S" (S=bananas~ in this example) is organized in a conceptual N-by-N matrix whose elements are characters and whose rows are the rotations (cyclic shifts) of S, sorted in lexicographical order. This example uses the word "bananas" as the original string of characters. This could be any length string. A matrix of characters is formed whose rows are cyclic shifts of the subject string, sorted in lexicographic order starting with the first column "(F)".

TABLE 3

| Row | (F)irst | | | | | | | (L)ast |
|---|---|---|---|---|---|---|---|---|
| 0 | a | n | a | n | a | s | ~ | b |
| 1 | a | n | a | s | ~ | b | a | n |
| 2 | a | s | ~ | b | a | n | a | n |
| 3 | b | a | n | a | n | a | s | ~ |
| 4 | n | a | n | a | s | ~ | a | a |
| 5 | n | a | s | ~ | b | a | ~ | a |
| 6 | s | ~ | b | a | n | a | n | a |
| 7 | ~ | b | a | n | a | n | a | s |

The second step of the transformation is to find the last characters of the rotations which are located in the last column in Table 3 above, under "(L)". The first column of sorted characters (F) results in "aaabnns~" and the last column of sorted characters (L) results in "bnn~aaas". The last column (L) is the transformed data that will be compressed, "bnn~aaas".

In comparing the sorted rotations in Example 2 with the suffix array in Example 1 a similarity is noted. If each string in Example 2 is truncated at the end marker '~' the suffix array is identical to the sorted rotations of the Burrows-Wheeler Transform.

At this point conventional compression techniques are applied to the last column of data "bnn~aaas" such as run length encoding, move to front encoding, order-0 adaptive arithmetic encoding, or similar techniques. The data is then transmitted to the server system where the data is decompressed using the reciprocal technique.

By applying the Burrows-Wheeler Transform the Table 3 shown in Example 2 can be recreated knowing only the contents of the last column (L), "bnn~aaas", and the position of the original string of characters (3 in this example "bananas"). These are given to the search server by the client to recreate the first column (F). A sort of all of the characters from the last column (L) "bnn~aaas" is conducted resulting in a lexicographic list which in this example is "aaabnns~". A list of predecessor characters is then built using the last column (L) "bnn~aaas" and determining how many predecessor characters exist in the sorted lexicographic list "aaabnns~". This results in:

'b' has 3 predecessors "aaa",
'n' has 4 predecessors "aaab",
'n' has 5 predecessors "aaabn",
'~' has 7 predecessors "aaabnns",
'a' has 0 predecessors "—",
'a' has 1 predecessor "a",
'a' has 2 predecessors "aa", and
's' has 6 predecessors "aaabnn".

This list of values (3,4,5,7,0,1,2,6) are transformation vectors "T" for restoring the original string of characters.

| T | 3470126 |
|---|---|
| Vector | 01234567 |

The transformation vector list can be listed in numeric order resulting in:

| T | 01234567 |
|---|---|
| Vector | 45601273 |
| Last Column String | bnn~aaas |

These lists are then used to recreate the original string of characters on the server system, as well as the suffix array that will be used for binary searches.

Given that position 3 of L represents the end point of the original string, the transformation vector for position 3 is a zero, which indicates that the next (first) character in the original string is the character 'b' that occupies position 0 in the L (bnn~aaas) list. Since the suffix represented by this 'b' ('bananas') occupies position 3 of the sorted matrix, we know that the correct character index for position 3 of the suffix array is 0. The transformation vector that is in position 0 is 4, indicating that the character 'a' in position 4 of the L (bnn~aaas) list is the next character of the original string, resulting in 'ba'. Since the suffix represented by this 'a' ('ananas') occupies position 0 of the sorted matrix, we know that the correct character index for position 0 of the suffix array is 1. The transformation vector that is in position 4 is 1, indicating that the character 'n' in position 1 of the L (bnn~aaas) list is the next character of the original string, resulting in 'ban'. Since the suffix represented by this 'n' ('nanas') occupies position 4 of the sorted matrix, we know that the correct character index for position 4 of the suffix array is 2. The transformation vector that is in position 1 is 5, indicating that the character 'a' in position 5 of the L (bnn~aaas) list is the next character of the original string, resulting in 'bana'. Since the suffix represented by this 'a' ('anas') occupies position 1 of the sorted matrix, we know that the correct character index for position 1 of the suffix array is 3. The transformation vector that is in position 5 is 2, indicating that the character 'n' in position 2 of the L (bnn~aaas) list is the next character of the original string, resulting in 'banan'. Since the suffix represented by this 'n' ('nas') occupies position 5 of the sorted matrix, we know that the correct character index for position 5 of the suffix array is 4. The transformation vector that is in position 2 is 6, indicating that the character 'a' in position 6 of the L (bnn~aaas) list is the next character of the original string, resulting in 'banana'. Since the suffix represented by this 'a' ('as') occupies position 2 of the sorted matrix, we know that the correct character index for position 2 of the suffix array is 5. The transformation vector that is in position 6 is 7, indicating that the character 's' in position 7 of the L (bnn~aaas) list is the next character of the original string, resulting in 'bananas'. Since the suffix represented by this 's' ('s') occupies position 6 of the sorted matrix, we know that the correct character index for position 6 of the suffix array is 6. The transformation vector that is in position 7 is 3, indicating that we have reached the end of the string. Since the suffix represented by this '~' ('~') occupies position 7 of the sorted matrix, we know that the correct character index for position 7 of the suffix array is 7.

While recreating the original string of characters, at each step as the system vectors through the transformed data, the current position is kept track of and the index of each character in the suffix array is recorded as shown below. This process of recreating the original string of characters and creating the suffix array is shown as:

The given starting position is 3, Suffix Array [3]=0
T[3]=0; L[0]='b', which is stored in position 0 of the restored string. Suffix Array [0]=1;
T[0]=4; L[4]='a', which is stored in position 1 of the restored string. Suffix Array [4]=2;
T[4]=1; L[1]='n', which is stored in position 2 of the restored string. Suffix Array [1]=3;
T[1]=5; L[5]='a', which is stored in position 3 of the restored string. Suffix Array [5]=4;
T[5]=2; L[2]='n', which is stored in position 4 of the restored string. Suffix Array [2]=5;
T[2]=6; L[6]='a', which is stored in position 5 of the restored string. Suffix Array [6]=6;
T[6]=7; L[7]='s', which is stored in position 9 of the restored string. Suffix Array [7]=7;

The inventive step of keeping track of the current position as the system vectors through the transformed data and recording the index of each character in the suffix array creates a suffix array list. This suffix array list is resorted in lexicographic order, which in the above example extracts the following sorted suffix array (1, 3, 5, 0, 2, 4, 6, 7). The sorted suffix array is the index in the preferred embodiment for rapidly and efficiently searching the original string "bananas". The search server stores the original string of characters and sorted suffix array in memory.

EXAMPLE 3

The following is an example of how a binary search can be used to determine whether or not a string of characters occurs within the string "bananas~". Given the character string:

TABLE 4

| Character | b | a | n | a | n | a | s | ~ |
|---|---|---|---|---|---|---|---|---|
| Index | 0 | 1 | 2 | 3 | 4 | 5 | 6 | 7 |

And the suffix array:

TABLE 5

| Element | Suffix Represented | Index |
|---|---|---|
| 0 | ananas | 1 |
| 1 | anas | 3 |
| 2 | as | 5 |
| 3 | bananas | 0 |
| 4 | nanas | 2 |
| 5 | nas | 4 |
| 6 | s | 6 |
| 7 | ~ | 7 |

If searching for the character combination 'as' the search begins with an interval covering the whole array of 8 characters. The middle element is number 3 (8/2=4; the 4th element is 3). The value of element 3 of the suffix array is 0. Element 0 of the original string is the 'b' which represents the suffix 'bananas'. Since the length of the search value 'as' is 2, only the first two characters of 'bananas' are compared. Since 'as' is lexicographically less than 'ba', the second half of the interval is ruled out and the first half of the full interval is used which results in the second interval as being 4 (8/2=4). The middle element of the second interval is 1 (4/2=2; 3−2=1) which represents the suffix 'anas'. Since 'as' is lexicographically greater than 'an' the first half of the second interval is ruled out and the second half of the second interval is used which results in the third interval as being 2 (4/2=2). The middle element of the third interval is 2 (2/2=1; 1+1=2) which represents the suffix 'as', which is the string being searched for.

If the search for a character combination is for 'ax' instead of 'as' the searching steps would be the same except the last step. Since 'ax' is lexicographically greater than 'as' the first half of the third interval is ruled out and the second half of the third interval is used which results in and the fourth interval as being 1 (2/2=1), which indicates that there is no match. With these examples completed the process is now well described.

Heretofore, all previous uses of the Burrows-Wheeler Transform (BWT) centered on the benefits it brought to the compression of data. The BWT rearranges the order of the characters in a block of input text to make it easy to compress with simple algorithms. This transformation is reversible. A complete sorting of each suffix of the original block of text is required during compression. During the decompression stage it is possible to efficiently build an index of each suffix of the original block of text. This suffix array can then be used to perform binary searches for any string of characters in the text. The method of the preferred embodiment implementing the Burrows-Wheeler Transform has the following steps:

To compress:
  Sort rotations
  Find last characters of rotations

To decompress:
  Find first characters of rotations
  Build list of predecessor characters
  Record Suffix Array while forming output string To conduct a search for certain file information, the client system submits a list of words that the user wants to search. The user may structure the search results by limiting the file extensions and limit the number of returned files. For file extensions the user may select all file extensions or limit it to specific file extensions. The search server arranges these words in order of obscurity, with the least frequently occurring word searched first. It performs a binary search through each library for the most obscure word. In each case where there is a match, the search server further qualifies each record for additional words from the list of words to searched for. If the search server is unable to return an adequate list of records to the client, it then impersonates a client, requesting the file from as many of the other search servers as are readily available. The search server then relays the resulting client identification, Internet address, port, and file location, filename file size to the client system. The user can then decide if he wants to get a copy of any of the search results. If the decision is to get a copy, the client system will contact the other client system with the available files and obtain a copy directly from that client system.

Figure 5:
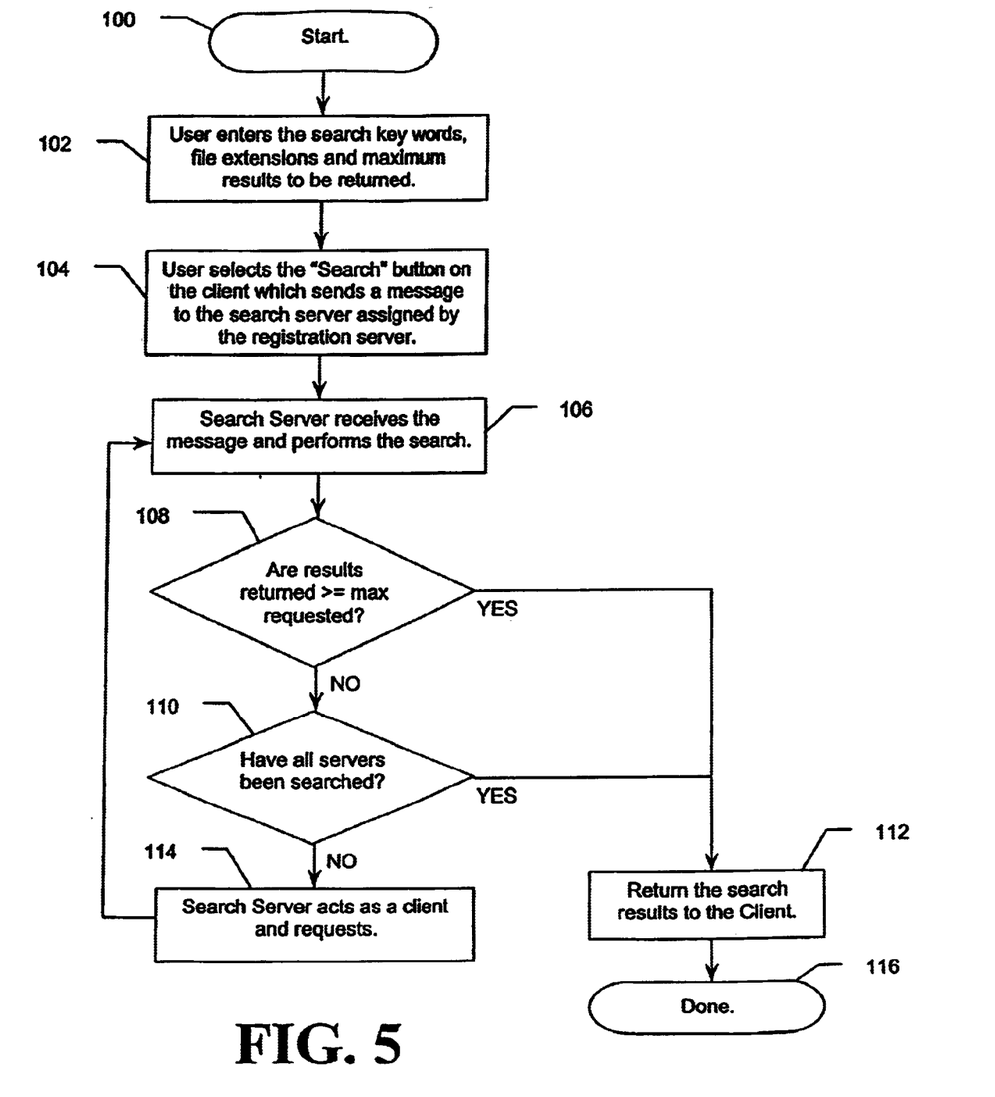
FIG. 5 is a flow chart illustrating the search process for data on search servers in the method of the present invention.

FIG. 5 illustrates in general the process whereby a search is initiated and carried out according to the methods of the present invention. The process shown in FIG. 5 would follow from the "registration" process described and shown in FIGS. 1 and 4. The search effort is initiated at a client system (Step 100) through the user entering the key words for the search, specifying the file extensions to be considered (.mp3, .wav, etc.) and the maximum number of results to be returned (Step 102). When the user selects the "search" button within the software running at the client system (Step 104) the search message is sent from the client system to an assigned search server system. The assigned search server receives the search request (Step 106) and initiates the performance of the search according to the methods described above. As search results are returned within the search server it continuously queries whether the results returned are greater than or equal to the maximum requested by the client user (Step 108). If so, the search results returned thus far are delivered to the client (Step 112) and the process ends (Step 116). If the maximum has not been reached then the assigned search server queries whether all servers available to the assigned search server have been searched (Step 110). If so, then again the results returned thus far are delivered to the client (Step 112) and the process ends (Step 116). If additional search servers are available and the maximum number of results have not been reached then the assigned search server acts as a client (Step 114) and sends the search request to the additional available search servers. These additional search servers act as the assigned server and process and perform the search (Step 106), continuing until either the maximum results are returned (Step 108) or all available search servers have been searched (Step 110). What results have been returned are then communicated to the client server (Step 112) as indicated above, which finally terminates the search process (Step 116).

Figure 7:
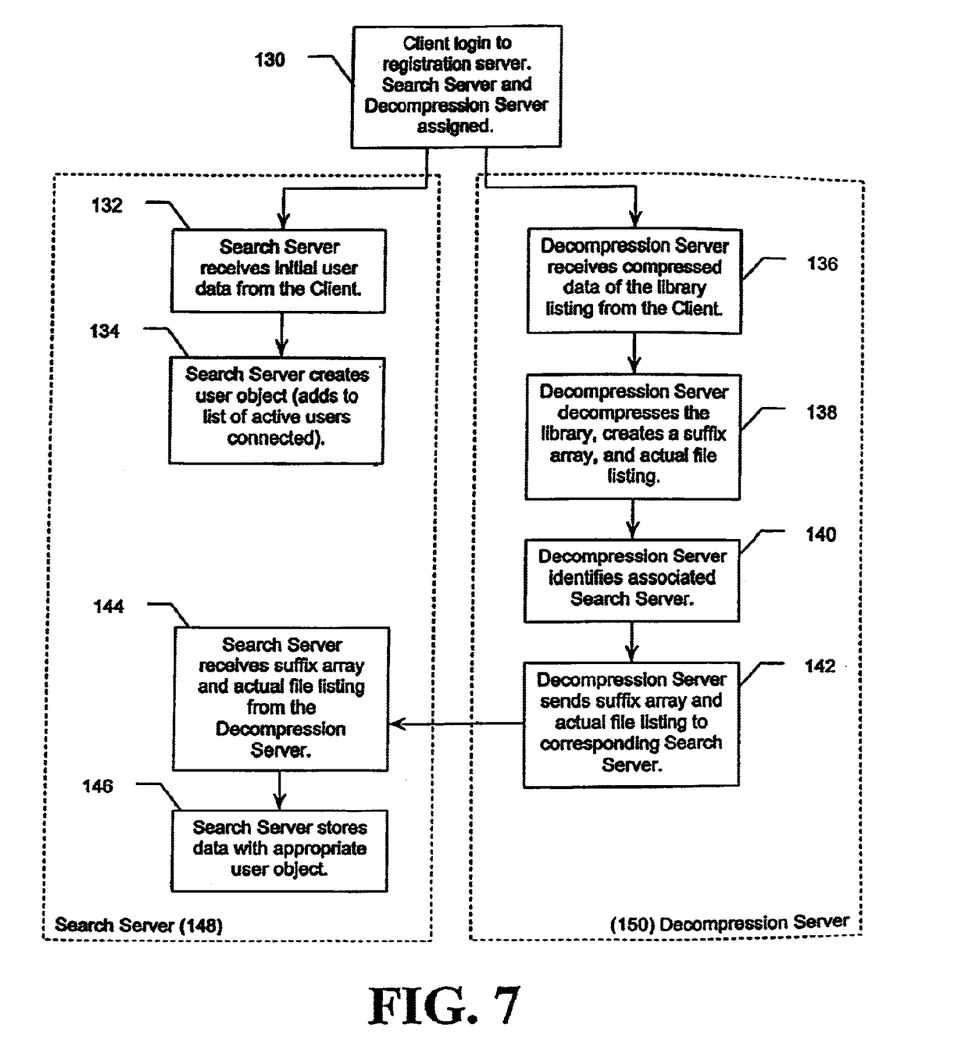
FIG. 7 is a flow chart further illustrating aspects of a registration process.
Figure 8:
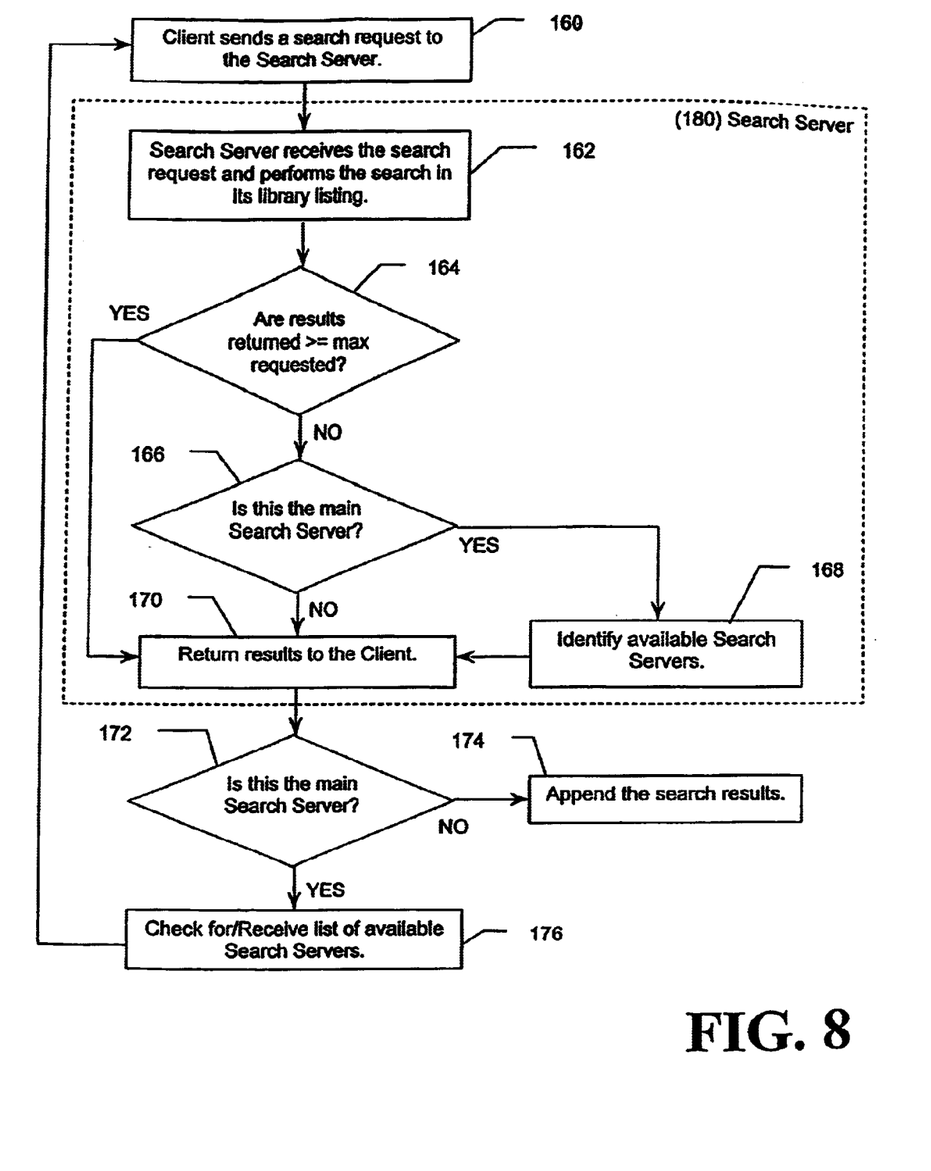
FIG. 8 is a flow chart further illustrating aspects of a search process.

Reference is now made to FIGS. 7 and 8 for a brief description of alternative refinements to the methods described above with regard to the registration process (FIG. 7) and the search process (FIG. 8). In FIG. 7 the registration process begins as described above at Step 130 with the client logging into the registration server with the appropriate user ID and password. As a response to the login message from the client, the registration server sends the IP addresses and ports of the available and most appropriate search server and decompression server. The objective in this refined preferred embodiment is to delegate the task of decompressing the stored data and suffix array to a separate server, allowing the search server to devote maximum resources to the search process. In FIG. 7, steps are carried out by search server 148 while steps are being carried out by decompression server 150. In Step 132, the client is connected to the assigned search server and sends the initial user data information. The search server receives the initial user data from the specified client. In Step 134 the search server creates a user object and adds it to the list of active users connected to the server.

While the server carries out the registration of initial user data, decompression server 150 receives, at Step 136, the compressed data of the library listing created by the client. At Step 138 the decompression server decompresses the library and creates a suffix array and actual file listing from the data. At Step 140 the decompression server then checks the name of the search server that the client has been assigned to and is presumably connected to. The decompression server checks for the connection on the active list of search servers it is connected to. Once it finds the appropriate search server, it sends the suffix array and the actual file listing (Step 142).

At Step 144 in FIG. 7, the search server once again picks up the process by receiving the suffix array and actual file listing from the decompression server and stores the data in conjunction with the appropriate user object (Step 146). If the search server cannot find the user object for this user in the user list, then it frees the data it receives from the decompression server and ignores the message.

FIG. 8 discloses a refined embodiment of the search process of the present invention, again with the objective of relieving the search server of some noncritical tasks. In the search process begun at Step 160, the client sends a search request to the search server. Search server 180 then receives the search request at Step 162 and performs the search in its library listing. If it does not find enough search results (Step 164) it determines if it is the main search server the client is connected to (Step 166). If so, it identifies other available search servers at Step 168 and sends that information along with any search results it has found, to the client at Step 170. If the search server at Step 164 has returned enough results, it immediately skips to Step 170 wherein it returns the results to the client. If insufficient results have been returned and the search server is not the main search server for the client, the search server recognizes that it is one of a number of secondary servers and simply returns the results it has found to the client at Step 170.

Upon receiving results from various search servers, the client determines at Step 172 whether the results are obtained from the main search server. If so, it checks at Step 176 to see if there was a list of search servers sent with the search results. It then connects to those search servers, back at Step 160 and sends the same search request to them. If the results received by the client are not from the main search server that the client was connected to, the search is still validated and either discarded or the results are added to other valid search results at Step 174.

Figure 6:
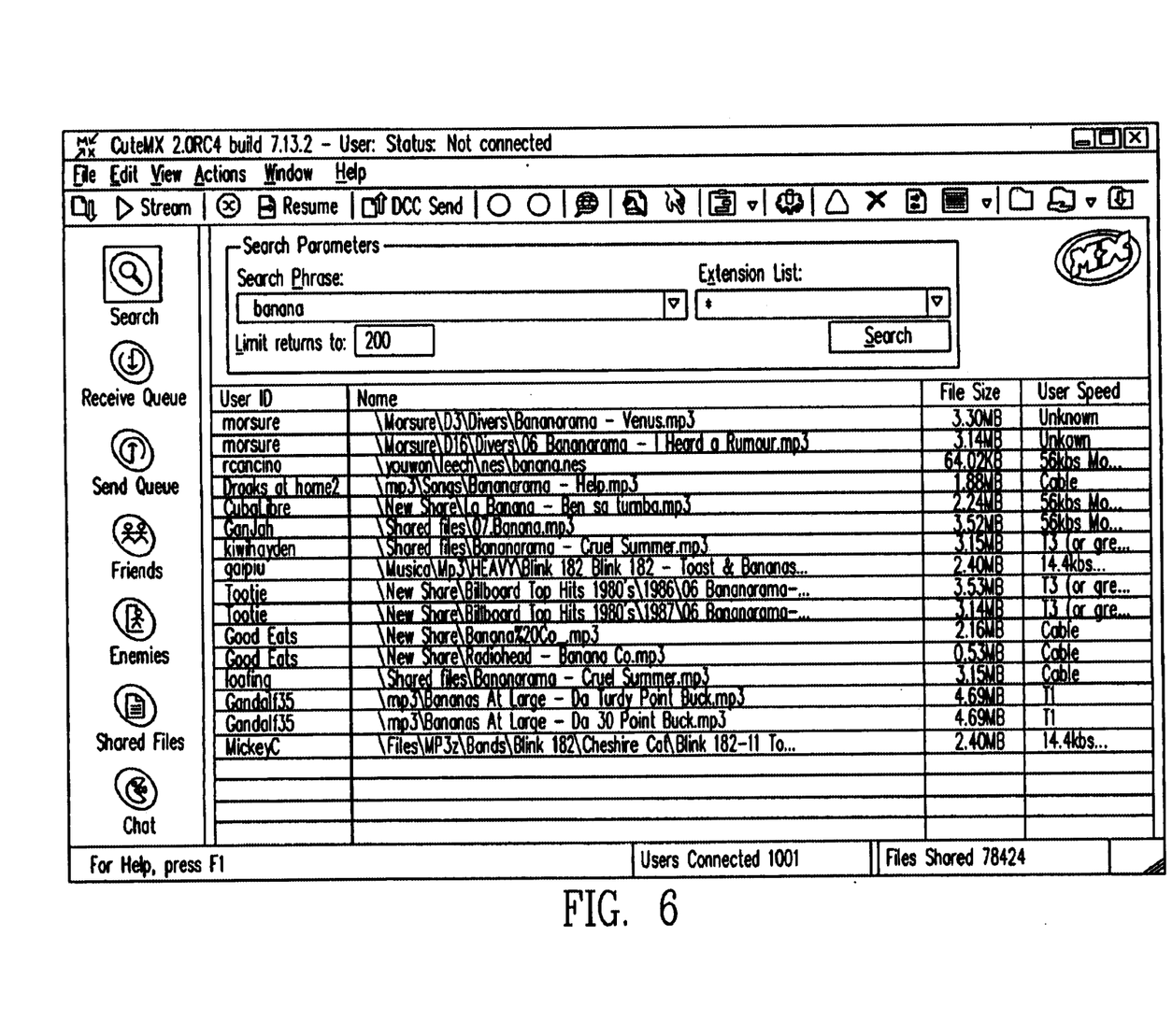
FIG. 6 is a screen image for a client system illustrating the search entry mechanism and search results in one embodiment of the present invention.

FIG. 6 provides an example of a display screen presented to the user at a client server after the above process of carrying out a search is accomplished. In the screen view shown the substance of the search carried out is displayed near the top of the screen providing information on the text searched (banana in this example), any file extension limitations (none in this example), and the maximum number of results to return (200 in this example). The search button which initiates the search action is also indicated to the user.

The lower section of the screen display shown in FIG. 6 comprises a table of returned search results. This table of results first lists the logged-in client users that retain files (data) that meet the search criteria. Second, this list identifies the file names associated with the client users that specifically were identified. In some cases more that one file is identified for a given client user. It is often the name of the file that allows the searching client user to determine whether the specific file or data matches what he or she is looking for. Finally the search results returned are identified by file size and user speed. This information additionally allows the searching client user to confirm the file requested and select an optimal source for the transfer of the file or data from the remote client user. The system and method of the present invention provide an efficient and effective searching process that requires a minimal and intuitive user interface.

The many features and advantages of the present invention are apparent from the detailed specification and figures and, thus, it is intended by the appended claims to cover all such features and advantages of the invention which fall within the true spirit and scope of the present invention. Furthermore, since numerous modifications and variations will readily occur to those skilled in the art, it is not desired that the present invention be limited to the exact construction and operation illustrated and described herein. And, accordingly, all suitable modifications and equivalents which may be resorted to are intended to fall within the scope of the claims. Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of indexing data with the assistance of a client computer system, the method comprising:
   a. under control of a client computer system
      i. gathering file information on data on said client system,
      ii. conducting a Burrows-Wheeler Transform on said file information, and
      iii. transmitting said transformed file information to a server system; and
   b. under control of said server computer system
      i. receiving said transformed file information,
      ii. creating the file information from said transformed file information,
      iii. creating a searchable index of said transformed file information, and
      iv. storing said searchable index and file information on said server system whereby said searchable index is created for use on said server system using said client system resources.

2. The method of claim 1 further comprising:
   a. under control of a client computer system, compressing said transformed file information prior to transmission to said server computer system, and
   b. under control of said server computer system, decompressing said transformed file information after reception by said server computer system.

3. The method of claim 1 further comprising:
a. under control of said client computer system,
  i. before said step of conducting a Burrows-Wheeler Transform on said file information, converting each upper case character in the original text of said file information to lower case;
  ii. after said step of conducting a Burrows-Wheeler Transform on said file information, appending said transformed file information with a string of bytes wherein each bit represents the original case of a character of said original text of said file information; and
b. under control of said server computer system, storing said string of bytes on said server system such that restoration of said original case of a character is enabled.

4. A method of indexing data with the assistance of a client computer system, the method comprising:
a. a client system signs on to a server system,
b. said client system searches for relevant data and file information of that data which the user is willing to share and creates an original string of characters which contains file information such as file name, location, and size,
c. said original string of characters is transformed using the Burrows-Wheeler transformation method,
d. during said transformation a rotation matrix is created of the original string of characters and is compressed using a standard compressing method,
e. said compressed data is transmitted to the server system
f. said server system decompresses the data using the reciprocal of said standard decompressing method
g. said transformation of the file information is reversed to recover the original string of characters,
h. while recovering the original string of characters, a suffix array is created,
i. said original string of characters and said suffix array are stored in the memory of said server system, and
j. a binary search can be conducted of the suffix array to locate any sub-string of characters within said original string of characters.

5. The method of claim 4 further comprising:
a. a second client system signing on to said server system
b. said second client system initiates a search of the memory of aid server system for a selected sub-string of characters,
c. once the selected sub-string of characters is found, said server system sends said second client system a list of the located relevant file information,
d. if the second user wants to obtain a copy of the data, a message is sent directly between said second client system and said first client system, and
e. said requested data is transferred from said first client system to said second client system.

6. The method of claim 5 further comprising
a. each client system willing to share data which is signed on to the server system will have said original string of characters and said suffix array created for each said client system and stored in said server system memory while each said client system is signed on to said server system, and
b. if a said client system signs off said server system, that said client system's original string of characters and suffix array are deleted from said server system whereby this creation of a client system's original string of characters and suffix array only while the client system is signed on the server system enables the server system to have a dynamic and constantly updated index of data, which is readily available for transfer between client systems.

7. A method comprising:
providing information describing at least one computer readable file operable to be made available by a first client computer system to a second client computer system;
transforming the information describing at least one computer readable file into transformed information, wherein at least a portion of the transformed information is in a format suitable for compression and wherein the transforming is reversible;
transmitting the at least a portion of the transformed information to a server computer system.

8. The method of claim 7 wherein the information describing at least one computer readable file further comprises a string of characters including at least one of a file name, a file location, a file type, a file size, a file description, and information about an original case for at least one of the string of characters.

9. The method of claim 7 further comprising:
compressing the at least a portion of the transformed information.

10. The method of claim 7 wherein the transforming the information describing at least one computer readable file into transformed information further comprises:
transforming the information describing at least one computer readable file according to a Burrows-Wheeler transform.

11. The method of claim 7 wherein the information describing at least one computer readable file further comprises a string of characters and wherein the transforming the information describing at least one computer readable file into transformed information further comprises:
representing each of a plurality of suffixes formed from the information describing at least one computer readable file with a respective pointer;
sorting the plurality of suffixes using the respective pointers; and
determining an array of characters based on the sorting the plurality of suffixes, wherein at least one of the characters in the array of characters is a prefix corresponding to at least one of the plurality of suffixes.

12. The method of claim 7 wherein the information describing at least one computer readable file further comprises a string of characters, the method further comprising:
transmitting to the server computer system an index value indicating a position within the at least a portion of the transformed information of a first character of the string of characters.

13. The method of claim 7 encoded in a computer readable medium as instructions executable on a computer system.

14. A method comprising:
receiving transformed information, wherein the transformed information is based on information describing at least one computer readable file operable to be made available by a first client computer system to a second client computer system;
transforming the transformed information to recover the information describing at least one computer readable file; and determining a plurality of suffix array values during the transforming the transformed information, the plurality of suffix array values indicating a sorted order of a corresponding plurality of suffixes present within the information describing at least one computer readable file.

15. The method of claim 14 wherein:

the information describing at least one computer readable file further comprises a string of characters;

the transforming the transformed information further comprises analyzing a transformation vector and the transformed information to determine an original order of a plurality of characters from the information, and the determining a plurality of suffix array values further comprises for at least one of the plurality of characters for which an original order is determined, assigning to a unique suffix array position a value corresponding to a position of the at least one of the plurality of characters in the original order from the information.

16. The method of claim 15 wherein the unique suffix array position is determined by from the transformation vector.

17. The method of claim 14 wherein the transforming the transformed information to recover the information describing at least one computer readable file further comprises:

transforming the transformed information according to a Burrows-Wheeler transform.

18. The method of claim 14 further comprising:

receiving a search string; and using the suffix array to determine if the search string is present in the information describing at least one computer readable file.

19. The method of claim 14 further comprising:

decompressing the transformed information.

20. The method of claim 14 encoded in a computer readable medium as instructions executable on a computer system.

* * * * *